United States Patent Office 3,178,365
Patented Apr. 13, 1965

3,178,365
CATALYTIC CONVERSION OF HYDROCARBONS WITH THE USE OF A NITROGEN COMPOUND AS AN ACTIVATOR
Joseph N. Miale, Runnemede, N.J., assignor to Socony Mobil Oil Company, Inc., a corporation of New York
No Drawing. Filed Dec. 15, 1961, Ser. No. 159,772
17 Claims. (Cl. 208—120)

This invention relates to a process for catalytically transforming certain classes of organic compounds in the presence of a unique catalyst, the activity of which is unexpectedly enhanced or promoted upon contact with a particularly specified compound containing nitrogen and oxygen. More particularly, the present invention is concerned with a method wherein an organic charge undergoes catalytic conversion in the presence of such compound and a catalyst consisting essentially of specified crystalline metal aluminosilicate salts.

It has heretofore been reported that various chemical reactions may be advantageously carried out by contact catalysis utilizing as catalysts, crystalline metal aluminosilicate zeolites having rigid three-dimensional networks made up of unit cells characterized by the substantial absence of change in unit cell dimensions upon dehydration and rehydration and a homogeneous highly uniform pore structure. The above requirements are fulfilled by certain crystalline zeolites known as molecular sieves. The reactions effectively catalyzed by such materials include, by way of example, hydrocarbon cracking, alkylation, dealkylation, disproportionation, isomerization and polymerization.

The ability of the above catalyst to influence and direct the course of chemical conversions entails an unusual degree of desirable catalytic selectivity. Briefly, two types of selectivity are involved; first geometrical selectivity, which depends on the relationship between the diameter of the pores in the crystal structure of the aluminosilicate zeolite and the diameter of the reactant and product molecules, and second, intrinsic catalytic selectivity, which depends on the choice of cations present on the internal surface of the crystalline metal aluminosilicate salt.

In accordance with the present invention, it has now been discovered that the catalytic characteristics of the above-indicated crystalline aluminosilicate salts are enhanced and advantageously promoted when catalytic transformation is carried out in the presence of such materials, which have undergone contact prior to completion of the desired transformation with a particularly designated class of compounds, containing nitrogen and oxygen. Thus, it has been found that treatment of the crystalline metal aluminosilicate catalyst with such activating compound may be carried out as a pretreating step or alternatively that such compound of oxygen and nitrogen may be introduced into the reaction zone simultaneously with the charge stock or subsequent to introduction of the charge stock but prior to completion of the desired catalytic transformation. Thus, it has been found that the presence in the reaction zone of a hereinafter designated compound containing oxygen and nitrogen increases the rate of a catalytic conversion reaction such as paraffin cracking with certain crystalline metal aluminosilicates under conditions for which catalytic activity already exists. In addition, it has been found by pretreating with such activating compound that a crystalline metal aluminosilicate which normally possesses little or no catalytic activity by reason of its being non-porous to the components of the reaction charge is rendered catalytically active. Likewise, it has been found by introducing such activating compound into a reaction zone containing a small pore size crystalline metal aluminosilicate normally inactive in conversion of the charge stock due to the inability of the charge components to enter the pores of the aluminosilicate, that such metal aluminosilicate is catalytically activated. Thus, with the present invention, it has been discovered that the presence of or treatment with a particularly designated compound containing oxygen and nitrogen unexpectedly enhances the catalytic activity and utility of the crystalline metal aluminosilicate zeolites.

In one embodiment, the present invention provides a method for effecting transformation of organic compounds, catalytically convertible in the presence of acidic catalyst sites, by contacting the same under conversion conditions with a catalyst of a crystalline metal aluminosilicate having rigid three-dimensional networks made up of unit cells characterized by the substantial absence of change in unit cell dimensions upon dehydration and rehydration and a homogeneous pore structure made up of highly uniform interstitial dimensions, which catalyst has undergone contact prior to completion of said transformation reaction to effectively enhance the activity thereof with a sufficient amount of a compound containing nitrogen and oxygen selected from the group consisting of oxides of nitrogen, compounds capable of conversion to said oxides and compounds characterized by the presence therein of $NO_2$ and $NO_3$ groups.

In another embodiment, the invention affords a method for cracking a hydrocarbon charge in the presence of such activating compound containing nitrogen and oxygen and the above crystalline metal aluminosilicate catalyst.

In a further embodiment, the invention resides in a method for converting organic compounds, catalytically convertible in the presence of acidic catalyst sites, by contacting the same with a crystalline metal aluminosilicate having a uniform pore structure made up of pores incapable of affording entry into the interior of the aluminosilicate of the organic compound charge, which aluminosilicate has undergone contact prior to conversion of said charge with a sufficient amount of a compound containing nitrogen and oxygen designated hereinabove to effectively enhance the activity of said aluminosilicate.

The metal aluminosilicates employed as catalysts in the process of this invention are essentially dehydrated forms of crystalline siliceous zeolites, containing varying quantities of alkali metal, alkaline earth metal and aluminum with or without other metals. All or a portion of the alkali metal and alkaline earth metal ions normally contained in the zeolitic structure may be replaced with a number of other ions. The atoms of alkali metal, alkaline earth metal or metals in replacement thereof, silicon, aluminum and oxygen are arranged in a definite and consistent crystalline pattern. Such structure contains a large number of small cavities, interconnected by a number of still smaller channels. These cavities and channels are precisely uniform in size. The intersitial dimensions of openings in the crystal lattice limit the size and shape of the molecules that can enter the interior of the aluminosilicate and it is such characteristic of many crystalline zeolites that has led to their designation as "molecular sieves."

Zeolites having the above characteristics include both natural and synthetic materials, for example, chabazite, gmelinite, mesolite, ptilolite, mordenite, natrolite, nepheline, sodalite, scapolite, lazurite, leucite and cancrinite. Synthetic zeolites may be of the A type, X type, Y type, T type or other well known form of molecular sieve, including ZK-zeolites such as those described in copending application Serial No. 134,841, filed August 30, 1961. Preparation of the above type zeolites is well known, having been described in the literature, for example A type zeolite in U.S. 2,882,243; X type zeolite in U.S. 2,882,244; Y type zeolite in Belgian Patent No. 577,642 and T type zeolite in U.S. 2,950,952. As initially prepared, the metal of the aluminosilicate is an alkali metal and usually sodium. Such alkali metal is subject to base exchange with a wide variety of other metal ions. The molecular sieve materials so obtained are unusually porous the pores having highly uniform molecular dimensions, generally between about 3 and about 15 Angstrom units in diameter. Each crystal of molecular sieve material contains literally billions of tiny cavities or cages interconnected by channels of unvarying diameter. The size, valence and portion of the metal ions in the crystal control the effective diameter of the interconnecting channels.

At the present time, there are commercially available molecular sieves of the "A" series and of the "X" series. A synthetic zeolite known as "Molecular Sieve 4A" is a crystalline sodium aluminosilicate having channels of about 4 Angstroms in diameter. In the hydrated form, this material is chemically characterized by the formula: $Na_{12}(AlO_2)_{12}(SiO_2)_{12} \cdot 27 H_2O$. The synthetic zeolite known as "Molecular Sieve 5A" is a crystalline aluminosilicate salt having channels about 5 Angstroms in diameter and in which substantially all of the 12 ions of sodium in the immediately above formula are replaced by calcium, it being understood that calcium replaces sodium in the ratio of one calcium for two sodium ions. A crystalline sodium aluminosilicate having pores approximately 10 Angstroms in diameter is also available commercially under the name of "Molecular Sieve 13X." The letter "X" is used to distinguish the interatomic structure of this zeolite from that of the "A" crystals mentioned above. As prepared, the 13X material contains water and has the unit cell formula: $Na_{86}[(AlO_2)_{86}(SiO_2)_{106}] \cdot 267 H_2O$. The 13X crystal is structurally identical with faujasite, a naturally occurring zeolite. Faujasite, however, is not identical in composition with the 13X zeolite. The synthetic zeolite known as "Molecular Sieve 10X" is a crystalline aluminosilicate salt having channels about 10 Angstroms in diameter and in which a substantial proportion of the sodium ions of the 13X material have been replaced by calcium.

Molecular sieves of the "X" series are characterized by the formula:

$$\frac{M_{86}}{n}[(AlO_2)_{86}(SiO_2)_{106}] \cdot 267 H_2O$$

where M is $Na^+$, $Ca^{++}$ or other metal ions introduced by replacement thereof and $n$ is the valence of the cation M. The structure consists of a complex assembly of 192 tetrahedra in a large cubic unit cell 24.95 A on an edge. Both X and Y type crystalline aluminosilicates have essentially identical crystal structures. They differ from each other in chemical composition with type Y aluminosilicate having a higher $SiO_2/Al_2O_3$ ratio than the X type aluminosilicate.

The alkali metal generally contained in the naturally occurring or synthetically prepared zeolites described above may be replaced partially or completely by other metal ions. Suitable replacing ions include other alkali metals, for example sodium may be replaced with lithium or potassium; alkaline earth metals such as calcium, strontium and magnesium, as well as various other ions such as those of cobalt, zinc, silver, nickel, copper, chromium, iron, zirconium, thorium, beryllium, manganese, palladium, tin, rhenium, aluminum, gold, platinum, cadmium, mercury, lanthanum, cerium and other rare earth metals. Replacement is suitably accomplished by contacting the initially formed crystalline aluminosilicate with a solution of an ionizable compound of the metal ion which is to be zeolitically introduced into the molecular sieve structure for a sufficient time to bring about the extent of desired introduction of such ion. After such treatment, the ion exchanged product is water washed, dried and calcined. The extent to which exchange takes place can be controlled. It is essential that the aluminosilicate undergoing activation in accordance with the present invention be a metal-containing aluminosilicate. Aluminosilicates in which all of the initial alkali metal is replaced by hydrogen or ammonium ions do not respond to activation with the acidic gases described herein. While the metal aluminosilicate employed may have been treated to effect a partial replacement of the metal ions with hydrogen or ammonium ions, it is essential that the aluminosilicate undergoing activation contain at least some metal cations. Such materials are designated herein as metal aluminosilicates.

The metal aluminosilicate may be employed directly as a catalyst or it may be combined with a suitable support or binder. The particular chemical composition of the latter is not critical. It is however necessary that the support or binder employed be thermally stable under the conditions at which the conversion reaction is carried out. Thus, it is contemplated that solid porous adsorbents, carriers and supports of the type heretofore employed in catalytic operations may feasibly be used in combination with the crystalline metal aluminosilicate. Such materials may be catalytically inert or may possess an intrinsic catalytic activity or an activity attributable to close association or reaction with the crystalline aluminosilicate. Such materials include by way of examples, dried inorganic oxide gels and gelatinous precipitates of alumina, silica, zirconia, magnesia, thoria, titania, boria and combinations of these oxides with one another and with other components. Other suitable supports include activated charcoal, mullite, gieselguhr, bauxite, silicon carbide, sintered alumina and various clays. These supported crystalline aluminosilicates may feasibly be prepared as described in copending application of Albert B. Schwartz, Serial No. 147,722, filed October 26, 1961, by growing crystals of the aluminosilicate in the pores of the support. Also, the aluminosilicate may be intimately composited with a suitable binder, such as inorganic oxide hydrogel or clay, for example, by ball milling the two materials together over an extended period of time, preferably in the presence of water, under conditions to reduce the particle size of the aluminosilicate to a weight mean particle diameter of less than 40 microns and preferably less than 15 microns. Also, the aluminosilicate may be combined with and distributed throughout a gel matrix by dispersing the aluminosilicate in powdered form in an inorganic oxide hydrosol. In accordance with this procedure, the finely divided aluminosilicate may be dispersed in an already prepared hydrosol or, as is preferable, where the hydrosol is characterized by a short time of gelation, the finely divided aluminosilicate may be added to one or more of the reactants used in forming the hydrosol or may be admixed in the form of a separate stream with streams of the hydrosol-forming reactants in a mixing nozzle or other means where the reactants are brought into intimate contact. The powder-containing inorganic oxide hydrosol sets to a hydrogel after lapse of a suitable period of time and the resulting hydrogel may thereafter, if desired, be base exchanged to introduce selected metal ions into the aluminosilicate and then dried and calcined.

The inorganic oxide gel employed, as described above as a matrix for the metal aluminosilicate, may be a gel of any hydrous inorganic oxide, such as, for example, aluminous or siliceous gels. While alumina gel or silica gel may be utilized as a suitable matrix, it is preferred that the inorganic oxide gel employed be a cogel of silica and an oxide of at least one metal selected from the group consisting of metals of Groups IIA, IIIB, and IVA of the Periodic Table. Such components include for example, silica-alumina, silica-magnesia, silica-zirconia, silica-thoria, silica-beryllia, silica-titania as well as ternary combinations such as silica-alumina-thoria, silica-alumina-zirconia, silica-alumina-magnesia and silica-magnesia-zirconia. In the foregoing gels, silica is generally present as the major component and the other oxides of metals are present in minor proportion. Thus, the silica content of such gels is generally within the approximate range of 55 to 100 weight percent with the metal oxide content ranging from zero to 45 weight percent. The inorganic oxide hydrogels utilized herein and hydrogels obtained therefrom may be prepared by any method well known in the art, such as for example, hydrolysis of ethyl ortho silicate, acidification of an alkali metal silicate, which may contain the salt of a metal, the oxide of which it is desired to cogel with silica, etc. The relative proportions of finely divided crystalline aluminosilicate and inorganic oxide gel matrix may vary widely with the crystalline aluminosilicate content ranging from about 2 to about 90 percent by weight and more usually, particularly where the composite is prepared in the form of beads, in the range of about 5 to about 50 percent by weight of the composite.

The catalyst of aluminosilicate employed in the present process is preferably used in the form of small fragments of a size best suited for operation under the specific conditions existing. Thus, the catalyst may be in the form of a finely divided powder or may be in the form of pellets of $\frac{1}{16}''$ or $\frac{1}{8}''$ size, for example, obtained from pelleting the crystalline aluminosilicate with a suitable binder such as clay, colloidal graphite, etc. Likewise, the metal aluminosilicate dispersed in a gel matrix or supported on a suitable porous support of the type described above may be utilized in any desired physical form. For example, hydrogel containing added crystalline metal aluminosilicate powder may be permitted to set in mass to a hydrogel which is thereafter dried and broken into pieces of desired size. The pieces of gel so obtained are generally of irregular shape. Uniformly shaped pieces of gel may be obtained by extrusion or pelleting of the aluminosilicate-containing hydrogel. Also, the hydrosol may be introduced into the perforations of a perforated plate and retained therein until the sol has set to a hydrogel, after which the formed hydrogel pieces are removed from the plate. A particularly feasible method is to prepare the catalyst in the form of spheroidal particles by dispersing the powdered metal aluminosilicate in a hydrosol and introducing globules of the resulting hydrosol into a body of water-immiscible liquid, for example an oil medium, wherein the globules of hydrosol set to a hydrogel and subsequently pass into an underlying layer of water from which they are sluiced to further processing operations such as base-exchange, water-washing, drying and calcining. Larger size spheres are ordinarily within the range of from about $\frac{1}{64}$ to about $\frac{1}{4}$ inch in diameter, whereas smaller size spheres, which are generally referred to as microspheres, are within the range of from about 10 to about 100 microns in diameter. The use of the spheroidally shaped articles is of particular advantage in hydrocarbon conversion processes in which the catalyst is subjected to continuous movement, such as the compact moving bed process, the fluidized process, etc. As applied to the stationary bed, spheroidal catalyst particles provide effective contact between the reactants and the catalyst by avoiding channeling.

While, for the production of spheroidal catalyst particles by the aforementioned technique, initial formation of a hydrosol which sets upon lapse of a short interval of time to an all-embracing bead-form hydrogel is essential, it is also feasible to employ, particularly where the catalyst is prepared in a form other than the spheroidal shape, a matrix comprising a gelatinous hydrous oxide precipitate with varying degrees of hydration or a mixture of a hydrogel and such gelatinous precipitate. The term gel, as utilized herein, is intended to include hydrogel, gelatinous precipitates and mixtures of the two. Also, the matrix may consist of or contain, as a component thereof, a clay and particularly a clay of the montmorillonite or kaolinite families, either raw or acid treated. Other suitable materials for use as the matrix of the present catalyst composition include charcoal, graphite, bauxite and other binders compatible with the crystalline metal aluminosilicate and thermally stable under the temperature conditions at which the catalyst is used.

The activating compounds containing nitrogen and oxygen utilized in the present process include the oxides of nitrogen such as nitrous oxide, nitric oxide, nitrogen dioxide and nitrogen pentoxide, as well as compounds which undergo decomposition at the temperature of contact with the catalyst to such specified oxides, such as for example nitroso compounds. Other activating compounds, found to be highly effective, include those containing $NO_2$ and $NO_3$ groups such as the nitrites and nitrates of various cations and preferably of those metals previously contained in the crystalline aluminosilicate undergoing activation such as alkali metal and alkaline earth metal; organic nitro compounds, such as nitrobenzene and nitrogen-containing oxyacids, for example, nitric acid.

Contact of the metal aluminosilicate catalyst with the above described activating compounds may be conducted as a pretreating step before bringing the catalyst into contact with the organic charge. Such pretreatment may be effected by contacting the catalyst with the activating compound in the gaseous state or by soaking the catalyst in an activating compound in the liquid state or in a solution of a solid activating compound dissolved in an appropriate solvent. Alternatively, the activating compound may be introduced, particularly when in the gaseous or vaporous state, simultaneously with the charge gas to contact with the crystalline aluminosilicate catalyst of such activating compound may be introduced into the reaction zone after contact between the charge stream and the aluminosilicate catalyst has been carried out for a predetermined interval of time. Also, in some instances, it may be desirable to periodically introduce the activating compound into the reaction zone while the charge gas is fed continuously thereto. The aluminosilicate catalyst may also be given a periodic treatment with the activating compound while out of contact with the charge gas, for example after periodic regeneration of the catalyst but prior to placing the regenerated catalyst on stream. It will be understood that the various above means for contacting the catalyst and activating compound do not necessarily afford equivalent or comparable results. It is, however, essential that contact between the catalyst and activating compound be made prior to substantial completion of the conversion under consideration.

The amount of activating compound utilized in any instance is sufficient to effectively enhance the activity of the aluminosilicate catalyst. The particular amount of such compound required to attain the desired promoting effect will vary depending on the specific catalyst employed, the nature of the catalytic process involved and the particular compound utilized for activation. Generally, however, the activating compound will be brought into contact with the catalyst in an amount corresponding to between about 0.05 and about 25 percent by weight based on the catalyst. In continuous operations a rate of feed of activating compound of about 1 percent to about 200 percent by weight per hour based on the catalyst will generally be employed, although in some instances amounts as small as 0.1 weight percent per hour may be used. Generally, the catalyst to charge stock volume ratio employed in carrying out the reactions contemplated by the present invention is within the approximate range of 0.02 to 10. The partial pressure of oxide of nitrogen activating gas when utilized in the reaction zone is generally within the range of about 0.01 to 10 atmospheres. Although a continuous feed of such gas has been found to be most effective, particularly in continuous process operations, there are reactions in which a transient activating gas contact produces a fairly long period of activation. In such cases, it is feasible to treat the catalyst intermittently with the activating gas rather than with a continuous stream. In processes operated on a batch basis, the supply of activating gas may consist of part of the charge. When the activating compound is one normally existing in the liquid or solid state, it is preferred to contact the same with the aluminosilicate catalyst by soaking the latter as a pretreating step directly in the liquid activating compound or in a solution of the solid activating compound for a predetermined period of time sufficient to deposit on the catalyst activating compound in the aforesaid amount.

When the activating compound is an oxide of nitrogen, such will generally be employed by contacting directly with the catalyst either in the absence or presence of the charge stock. It is, however, contemplated that such gas may also be produced in situ during the course of the catalytic reaction. The use of an oxide of nitrogen as an activator for the catalyst has the further advantage of emerging from the reaction zone along with the products and being capable of easy separation therefrom. Thus, the oxide of nitrogen activating gas emerging with any gaseous products may be removed for example by contacting the gases with a suitable sorbent. The presence of an oxide of nitrogen in any liquid products is usually negligible since the solubility in most liquid products is sufficiently small so as not to be troublesome. If desired or necessary, however, the liquid product may be substantially freed of any oxide of nitrogen by heating or by washing the product with a suitable sorbent therefor such as a solution of caustic soda.

Although the effectiveness of activation of the crystalline metal aluminosilicate catalyst with an activating compound containing nitrogen and oxygen as described herein, has been observed with different ionic forms of the above-described crystalline aluminosilicates, the greatest increase in activation has been observed with the alkali and alkaline earth aluminosilicate salts. A very marked effect has been realized with alkali metal and alkaline earth metal aluminosilicates having uniform pore openings in the range of 5 to 15 Angstroms. It has been established that after contact with an activating compound, as described herein, such materials are activated to a level of catalytic effectiveness which is greatly above that achieved with the use of the untreated catalyst. Thus, it has been found that the catalytic activities of the crystalline metal aluminosilicate catalysts which have undergone treatment with an activating compound as described herein possess catalytic activities of two or more times the activities of the same catalysts which have not been so treated. For certain of the crystalline aluminosilicates, particularly those composed of networks of sodalite units, for example X-type sodium aluminosilicate and sodalite, it has been observed that the catalyst retains increased activity after being subjected to treatment with the activating compound and subsequently removed from contact therewith. For these aluminosilicates initial contacting with the activating compound may be followed by operation without continuous activating treatment. For example, nitrogen oxide activated gas contact can be practiced as a pretreating operation or as a periodic treatment. The latter method of operation is particularly applicable as part of a cyclic operation, i.e. after regeneration of the catalyst and prior to catalytic conversion.

It has further been found that crystalline metal aluminosilicates which are essentially inactive for catalyzing reactions in the presence of acidic catalyst sites by reason of their small uniform port structure incapable of penetration by the organic charge may be rendered catalytically active by treatment with an activating compound as described herein. Thus, following the teachings of this invention, it is possible to convert essentially inactive metal aluminosilicates having uniform pore openings of not greater than about 4 Angstroms in diameter to catalytically active materials by treating with an activating compound as described hereinabove. In such manner, sodalite, A-type sodium aluminosilicate and A-type potassium aluminosilicate having pores incapable of penetration by the organic charge may be transformed into useful catalysts by the activation technique of the instant invention.

Treatment of silica-alumina gel conversion catalysts with a nitrogen and oxygen containing compound, such as described hereinabove, afforded only a minor improvement in activity when compared with that achieved upon treatment of the crystalline metal aluminosilicates. Likewise, activation of clay hydrocarbon conversion catalysts with a compound such as described herein results in only comparatively minor improvement in activity as contrasted with the very marked improvement realized upon activation of the crystalline metal aluminosilicates.

The reactions promoted by the nitrogen and oxygen activating compounds with the crystalline aluminosilicate zeolites described herein involve conversion of certain classes of organic compounds, including cracking of paraffinic, olefinic, aromatic and naphthenic hydrocarbons as well as mixtures thereof, for example petroleum fractions, such as those boiling in the gas oil range; disproportionation of aromatics; dehydration of alcohols to olefins and ethers; hydration of olefins to alcohols; isomerization and polymerization of olefins; isomerization of terpenes; alkylation and dealkylation of aromatic hydrocarbons.

The cracking of hydrocarbons, particularly normal hydrocarbons having a carbon chain of from 5 to 30 carbon atoms, represents an especially advantageous use of the activated crystalline metal aluminosilicate catalysts since the nature of the products may be well controlled. The catalyst in such process may be used as pellets in a fixed bed operation or they may be used in a compact moving bed operation or in a fluidized operation. The general operating conditions cover a wide range because of the wide utility of the catalysts. In cracking paraffins for the production of olefins, it is generally desirable to carry out such process at atmospheric pressure, employing a temperature in the approximate range of 700 to 1200° F. and preferably 800 to 1000° F. The liquid hourly space velocity of the charge may range from 0.2 to 4.0, preferably from 0.5 to 2.0. The normal paraffins that may be charged range from $C_5$ to $C_{30}$ paraffins and mixtures thereof. Generally, the conversion of charge improves with increasing molecular weight, so that for hexane cracking, for example, the low ranges of space velocity and higher temperatures are desirable for satisfactory conversion. The cracking of other crackable hydrocarbons including aromatics containing alkyl chains, naphthenes and olefins is likewise advantageously carried out with the hereinabove-described catalyst which have undergone treatment with the specified nitrogen and oxygen-containing compounds.

Catalytic cracking with the activated crystalline metal aluminosilicate catalysts described herein may be carried out by contacting a crackable hydrocarbon charge at catalytic cracking conditions employing a temperature within the approximate range of 550 to 1100° F. and under a pressure ranging from subatmospheric pressure up to several hundred atmospheres. The contact time of hydrocarbon charge with the catalyst is adjusted in any case according to the conditions, the particular charge stock and the particular results desired to give a substantial amount of cracking to lower boiling products.

Thus, as illustrative of the usefulness of their invention, it has been established that paraffinic hydrocarbons may be cracked over the activated crystalline metal aluminosilicate catalysts to afford a high yield of olefins. The latter are particularly desirable products since they are susceptible to a wide variety of useful applications. They may be employed, for example, in the formation of high octane alkylate; they also may be used for alkylation of benzene to form cumene and other alkyl benzenes; or they may be polymerized to liquid fuels or to form plastics such as polyethylene and polypropylene. In many instances, these desirable olefin products may be formed in high yields by cracking low-valued petroleum charge stocks such as paraffinic materials in the $C_6$–$C_{10}$ range.

In addition to cracking, it is contemplated that the activation technique of this invention may be used with the above-described crystalline aluminosilicate catalysts in various other reactions in which organic compounds undergo chemical conversion or transformation into useful products in the presence of acidic catalyst sites. Thus, the isomerization of olefins and cycloolefins, such as terpenes and alkylcyclopentanes; the dehydration of alcohols to ethers and olefins; the disproportionation of aromatic compounds; the polymerization of olefins and vinyl-aromatic compounds and the alkylation and dealkylation of aromatics are all reactions which normally are catalyzed by acidic catalysts. The promotion of such reactions over the crystalline metal aluminosilicate catalysts referred to herein are thus logically to be included within the scope of the present invention.

The following examples will serve to illustrate the method of the present invention without limiting the same:

EXAMPLE 1

Sodium X-type aluminosilicate, known commercially as Molecular Sieve 13X, was employed as the catalyst. A stream of helium was bubbled through liquid n-hexane at a rate of 10 ml./min. at room temperature and thereafter over a bed of 1½ ml. of the above catalyst maintained at a temperature of 1000° F. Cracking was initially carried out in the absence of an oxide of nitrogen. After 82 minutes, nitrous oxide was introduced into the charge stream at a rate of 0.5 ml./min. After flowing for 90 minutes, the stream of nitrous oxide was cut off. Samples of the gaseous products were analyzed by gas chromatography at intervals of from 10–250 minutes on stream. The results are shown below in Table I:

Table I

| Time on Stream, (Min.) | $N_2O$ On or Off | n-Hexane Conversion, percent |
| --- | --- | --- |
| 10 | Off | 12 |
| 80 | Off | 10 |
| 82 | On | |
| 110 | On | 31 |
| 170 | On | 31 |
| 172 | Off | |
| 250 | Off | 26 |

From the above data, it will be seen that the cracking activity of the sodium aluminosilicate zeolite is increased approximately 2½ times by the introduction of nitrous oxide in the feed gas. It is also evident that even after the addition of the nitrous oxide activating gas was terminated the activity of the treated catalyst was still very much higher than that of the untreated catalyst.

EXAMPLE 2

A sample of 1.5 ml. of sodium X-type crystalline aluminosilicate, known commercially as Molecular Sieve 13X, was treated at a temperature of about 700° F. in a stream of nitric oxide flowing at a rate of about 20 ml./min. for a period of about 1 hour. The aluminosilicate so treated was thereafter purged with helium and tested for hexane cracking activity utilizing the procedure in Example 1. The results obtained are shown below in Table II:

Table II

| Time on Stream, (Min.) | n-Hexane Conversion |
| --- | --- |
| 13 | 42.5 |
| 35 | 39.5 |

The activities imparted to the catalyst in this example was about 3½ times that observed for the untreated aluminosilicate.

EXAMPLE 3

A sample of 1.5 ml. of sodium A-type crystalline aluminosilicate, known commercially as Molecular Sieve 4A, was treated at a temperature of about 700° F. in a stream of nitric oxide flowing at a rate of about 20 ml./minute for a period of about 1 hour. The aluminosilicate so treated was thereafter purged with helium and tested for hexane cracking activity utilizing the procedure in Example 1. The results obtained, together with those for the untreated catalyst, are shown below in Table III:

Table III

| Catalyst Treatment | Time on Stream, Min. | n-Hexane Conversion |
| --- | --- | --- |
| Untreated | 11 | 1.2 |
| With NO | 5 | 15.9 |

The activity imparted to the catalyst in this example was about 10 times that observed for the untreated aluminosilicate.

EXAMPLE 4

A sample of 1.5 ml. of sodium X-type crystalline aluminosilicate was contacted with a saturated aqueous solution of sodium nitrite for 30 minutes. The aluminosilicate so treated, after removal from the solution, was dried and tested for hexane cracking activity utilizing the procedure in Example 1. The results obtained are shown below in Table IV:

Table IV

| Catalyst Treatment | Time on Stream, Min. | n-Hexane Conversion |
| --- | --- | --- |
| Untreated | 6 | 12.0 |
| With $NaNO_2$ | 6 | 26.7 |

As will be noted, a very substantial increase in cracking activity was achieved after treatment with sodium nitrite.

EXAMPLE 5

A sample of 1 ml. of sodium X-type crystalline aluminosilicate was contacted with an excess of nitrobenzene for 30 minutes. The aluminosilicate, after removal from the nitrobenzene, was dried and tested for hexane cracking activity as in Example 1. The results obtained are shown below in Table V:

Table V

| Catalyst Treatment | Time on Stream, Min. | n-Hexane Conversion |
| --- | --- | --- |
| Untreated | 6 | 8.0 |
| With $C_6H_5NO_2$ | 5 | 21.4 |
| | 26 | 22.0 |

Again, a marked improvement in cracking activity was obtained resulting from treatment with nitrobenzene.

EXAMPLE 6

A sample of 1.4 ml. of calcium A-type crystalline aluminosilicate, known commercially as Molecular Sieve 5A, was contacted with a saturated aqueous solution of calcium nitrate for 30 minutes. After removal from the solution, the aluminosilicate was dried and tested for cracking activity as in the previous examples. The results obtained are shown below in Table VI:

Table VI

| Catalyst Treatment | Time on Stream, Min. | n-Hexane Conversion |
| --- | --- | --- |
| Untreated | 6 | 3.5 |
| With $Ca(NO_3)_2$ | 5 | 67.2 |

As evident from the above data, a very great improvement in cracking activity was accomplished by treatment with calcium nitrate.

EXAMPLE 7

A sample of 1.5 ml. of sodium A-type crystalline aluminosilicate, known commercially as Molecular Sieve 4A, was soaked in a 1 N aqueous solution of nitric acid for 20 minutes. The acid was then removed and the aluminosilicate dried and tested for hexane cracking activity as described above. The results obtained are shown below in Table VII:

*Table VII*

| Catalyst Treatment | Time on Stream, Min. | n-Hexane Conversion |
| --- | --- | --- |
| Untreated | 11 | 1.2 |
| With HNO$_3$ | 5 | 1.7 |

It will be seen from the above data that an enhanced cracking activity resulted from the treatment with nitric acid solution but that such improvement in cracking activity was not as great as that achieved upon treatment with gaseous nitric oxide as in Example 3.

EXAMPLE 8

A sample of 1.4 ml. of calcium A-type crystalline aluminosilicate, i.e. Molecular Sieve 5A, was treated with nitric acid solution as in Example 7 and tested for cracking activity. The results obtained are shown below in Table VIII:

*Table VIII*

| Catalyst Treatment | Time on Stream, Min. | n-Hexane Conversion |
| --- | --- | --- |
| Untreated | | 3.5 |
| With HNO$_3$ | 5 | 39.9 |

It will again be evident that a marked improvement in cracking activity was obtained after treatment with nitric acid.

It is to be understood that the above description is merely illustrative of preferred embodiments of the invention of which many variations may be made by those skilled in the art without departing from the spirit thereof.

I claim:

1. A method for effecting transformation of organic compounds, catalytically convertible in the presence of acidic catalyst sites, which comprises contacting the same under conversion conditions with a catalyst of a crystalline metal aluminosilicate which has undergone contact prior to completion of said transformation with a compound containing nitrogen and oxygen selected from the group consisting of nitrous oxide, nitric oxide, organo nitro compounds, metal nitrites and metal nitrates, said compound being present in an amount sufficient to effectively enhance the activity of said catalyst, which catalyst has rigid three-dimensional networks made up of unit cells characterized by the substantial absence of change in unit cell dimensions upon dehydration and rehydration and a uniform pore structure made up of pores of between about 3 and about 15 Angstrom units in diameter.

2. The method of claim 1 wherein the compound containing nitrogen and oxygen is nitrous oxide.

3. The method of claim 1 wherein the compound containing nitrogen and oxygen is an organic nitro compound.

4. The method of claim 1 wherein the compound containing nitrogen and oxygen is nitric oxide.

5. The method of claim 1 wherein the compound containing nitrogen and oxygen is selected from the group consisting of a metal nitrite and a metal nitrate, said metal being identical with the cation of the crystalline aluminosilicate undergoing treatment.

6. A method for effecting transformation of organic compounds, catalytically convertible in the presence of acidic catalyst sites, which comprises contacting the same under conversion conditions with a catalyst consisting essentially of a crystalline metal aluminosilicate in finely divided form and a binder therefor, which catalyst has undergone contact prior to completion of said transformation with a compound containing nitrogen and oxygen selected from the group consisting of nitrous oxide, nitric oxide, organo nitro compounds, metal nitrites and metal nitrates, said compound being present in an amount sufficient to effectively enhance the activity of said catalyst, the aluminosilicate component of which has rigid three-dimensional networks made up of unit cells characterized by the substantial absence of change in unit cell dimensions upon dehydration and rehydration and a uniform pore structure made up of pores of between about 3 and about 15 Angstroms in diameter.

7. A method for effecting transformation of organic compounds, catalytically convertible in the presence of acidic catalyst sites, which comprises contacting the same under conversion conditions with a catalyst consisting essentially of a crystalline metal aluminosilicate contained in an inorganic oxide gel matrix, which catalyst has undergone contact prior to completion of said transformation with a compound containing nitrogen and oxygen selected from the group consisting of nitrous oxide, nitric oxide, organo nitro compounds, metal nitrites and metal nitrates, said compound being present in an amount sufficient to effectively enhance the activity of said catalyst, the aluminosilicate component of which has rigid three-dimensional networks made up of unit cells characterized by the substantial absence of change in unit cell dimensions upon dehydration and rehydration and a uniform pore structure made up of pores of between about 3 and about 15 Angstrom units in diameter.

8. A method for effecting transformation of organic compounds, catalytically convertible in the presence of acidic catalyst sites, which comprises contacting the same under conversion conditions with a catalyst of a crystalline aluminosilicate composed of networks of sodalite units, which catalyst has undergone contact prior to completion of said transformation with a compound containing nitrogen and oxygen selected from the group consisting of nitrous oxide, nitric oxide, organo nitro compounds, metal nitrites and metal nitrates, said compound being present in an amount sufficient to effectively enhance the activity of said catalyst, which catalyst has rigid three-dimensional networks made up of unit cells characterized by the substantial absence of change in unit cell dimensions upon dehydration and rehydration and a uniform pore structure made up of pores of between about 3 and about 15 Angstrom units in diameter.

9. A method for cracking a hydrocarbon charge which comprises contacting the same under catalytic cracking conditions with a catalyst of a crystalline metal aluminosilicate which has undergone contact prior to completion of said cracking with a compound containing nitrogen and oxygen selected from the group consisting of nitrous oxide, nitric oxide, organo nitro compounds, metal nitrites and metal nitrates, said compound being present in an amount sufficient to effectively enhance the activity of said catalyst, which catalyst has rigid three-dimensional networks made up of unit cells characterized by the substantial absence of change in unit cell dimensions upon dehydration and rehydration and a uniform pore structure made up of pores of between about 3 and about 15 Angstrom units in diameter.

10. The method of claim 9 wherein the compound containing nitrogen and oxygen is nitrous oxide.

11. The method of claim 9 wherein the compound containing nitrogen and oxygen is nitric oxide.

12. The method of claim 9 wherein the compound containing nitrogen and oxygen is nitrobenzene.

13. The method of claim 9 wherein the compound containing nitrogen and oxygen is selected from the group consisting of a metal nitrite and a metal nitrate, said metal being identical with the cation of the crystalline aluminosilicate undergoing treatment.

14. A method for cracking a normally paraffinic hydrocarbon, having a carbon chain of from 5 to 30 carbon atoms which comprises contacting the same under catalytic cracking conditions with a catalyst of a crystalline metal aluminosilicate which has undergone contact prior to completion of said cracking with a compound containing nitrogen and oxygen selected from the group consisting of nitrous oxide, nitric oxide, organo nitro compounds, metal nitrites and metal nitrates, said compound being present in an amount sufficient to effectively enhance the activity of said catalyst, which catalyst has rigid three-dimensional networks made up of unit cells characterized by the substantial absence of change in unit cell dimensions upon dehydration and rehydration and a uniform pore structure made up of pores of between about 3 and about 15 Angstrom units in diameter.

15. A method for effecting transformation of organic compounds, catalytically convertible in the presence of acidic catalyst sites, which comprises contacting the same under conversion conditions with a catalyst of a crystalline metal aluminosilicate having pores normally incapable of penetration by said organic compounds, which catalyst has undergone contact prior to completion of said transformation with a compound containing nitrogen and oxygen selected from the group consisting of nitrous oxide, nitric oxide, organo nitro compounds, metal nitrites and metal nitrates, said compound being present in an amount sufficient to effectively enhance the activity of said catalyst, which catalyst has rigid three-dimensional networks made up of unit cells characterized by the substantial absence of change in unit cell dimensions upon dehydration and rehydration and a uniform pore structure made up of pores of between about 3 and about 5 Anstroms in diameter.

16. A method for effecting transformation of organic compounds catalytically convertible in the presence of acidic catalyst sites which comprises contacting the same under conversion conditions with a catalyst of a crystalline metal aluminosilicate which has undergone pretreatment with a compound containing nitrogen and oxygen selected from the group consisting of nitrous oxide, nitric oxide, organo nitro compounds, metal nitrites and metal nitrates, said compound being present in an amount sufficient to effectively enhance the activity of said catalyst, which catalyst has rigid three-dimensional networks made up of unit cells characterized by the substantial absence of change in unit cell dimensions upon dehydration and rehydration and a uniform pore structure made up of pores of between about 3 and about 15 Angstrom units in diameter.

17. A method for effecting transformation of organic compounds, catalytically convertible in the presence of acidic catalyst sites, which comprises passing the same through a reaction zone containing a catalyst of a crystalline metal aluminosilicate, maintained under conversion conditions, introducing into and maintaining during the transformation in said reaction zone a compound containing nitrogen and oxygen selected from the group consisting nitrous oxide, nitric oxide, organo nitro compounds, metal nitrites and metal nitrates, said compound being present in an amount sufficient to effectively enhance the activity of said catalyst, which catalyst has rigid three-dimensional networks made up of unit cells characterized by the substantial absence of change in unit cell dimensions upon dehydration and rehydration and a uniform pore structure made up of pores of between about 3 and about 15 Angstrom units in diameter.

References Cited by the Examiner

UNITED STATES PATENTS

| | | | |
|---|---|---|---|
| 1,971,190 | 8/34 | Lelgemann | 208—114 |
| 2,351,793 | 6/44 | Voorhees | 208—7 |
| 2,971,903 | 2/61 | Kimberlin et al. | 208—119 |
| 3,033,788 | 5/62 | Frilette | 208—120 |

ALPHONSO D. SULLIVAN, *Primary Examiner.*

UNITED STATES PATENT OFFICE
CERTIFICATE OF CORRECTION

Patent No. 3,178,365            April 13, 1965

Joseph N. Miale

It is hereby certified that error appears in the above numbered patent requiring correction and that the said Letters Patent should read as corrected below.

Column 2, line 72, for "Belgian" read -- Belgium --; column 3, line 5, after "porous" insert a comma; column 4, line 30, for "gieselguhr" read -- kieselguhr --; column 7, line 60, for "port" read -- pore --; column 8, line 45, for "catalyst" read -- catalysts --; line 58, for "their" read -- this --; column 14, line 25, before "nitrous" insert -- of --.

Signed and sealed this 14th day of September 1965.

(SEAL)
Attest:

ERNEST W. SWIDER
Attesting Officer

EDWARD J. BRENNER
Commissioner of Patents